United States Patent [19]
Klein et al.

[11] Patent Number: 5,980,329
[45] Date of Patent: Nov. 9, 1999

[54] ELECTRICAL COMPONENT AND A HOUSING FOR USE THEREWITH

[75] Inventors: David Allen Klein; Morton Harold Fluck, both of Kernersville; Harry Lee Sparks, Jr., Lewisville, all of N.C.

[73] Assignee: The Whitaker Corporation, Wilmington, Del.

[21] Appl. No.: 08/881,401

[22] Filed: Jun. 24, 1997

Related U.S. Application Data

[60] Provisional application No. 60/021,168, Jul. 1, 1996.

[51] Int. Cl.$^6$ ................................................ H01R 13/405
[52] U.S. Cl. ........................................... 439/736; 439/936
[58] Field of Search ..................................... 439/606, 736, 439/76.2, 936, 709

[56] References Cited

U.S. PATENT DOCUMENTS

| | | | |
|---|---|---|---|
| 3,789,349 | 1/1974 | Scott | 339/233 S |
| 4,274,697 | 6/1981 | Dodge et al. | 339/103 R |
| 4,334,730 | 6/1982 | Colwell et al. | 339/130 C |
| 4,384,757 | 5/1983 | Andrews, Jr. et al. | 339/258 R |
| 4,585,293 | 4/1986 | Czeschka et al. | 339/221 R |
| 4,952,529 | 8/1990 | Grider | 437/209 |
| 4,981,445 | 1/1991 | Bacher et al. | 439/578 |
| 5,057,030 | 10/1991 | Hutson et al. | 439/606 |
| 5,097,592 | 3/1992 | Schultz, Jr. et al. | 439/736 |
| 5,176,541 | 1/1993 | Mori | 439/736 |
| 5,727,421 | 3/1998 | Murphy | 439/913 |

FOREIGN PATENT DOCUMENTS

| | | |
|---|---|---|
| 889080 | 2/1962 | United Kingdom . |
| 959981 | 6/1964 | United Kingdom . |
| 2 003 334 | 3/1979 | United Kingdom ............. H01R 9/22 |
| 2 003 335 | 3/1979 | United Kingdom ............. H01R 9/16 |
| 2 110587 | 6/1983 | United Kingdom ............. B29F 1/10 |
| 2 140 222 | 11/1984 | United Kingdom ........... H01R 13/50 |
| 2 207 079 | 1/1989 | United Kingdom ........... B29C 67/18 |

OTHER PUBLICATIONS

Patents Act 1977; Search Report under Section 17; Date of search: Sep. 15, 1997; Examiner: Monty Siddique; Application No: GB 9713491.0.

*Primary Examiner*—Michael L. Gellner
*Assistant Examiner*—Briggitte R. Hammond

[57] ABSTRACT

A housing assembly 5 for use with electrical/electronic components includes a housing 10, spacer sleeves 20 spaced along a periphery of the housing 10, and at least one electrical component 40 in a cavity 6 of the housing 10. Electrical component 40 includes a pair of electrical contacts 46 molded in a dielectric body 41, and each contact 46 includes a midsection 47 of a generally arcuate shape. The contacts 46 maximize the amount of electrical power to be transmitted therethrough and are electrically isolated from other electrical components in the housing, and the arcuate midsection 47 strengthens the contact to prevent deformation thereof during the injection molding process. Additionally, body 41 comprises annular recesses 42 which receive the housing material therein during an insert molding process, thereby sealingly fixing the component 40 in the housing 10 and minimizing production costs.

8 Claims, 4 Drawing Sheets

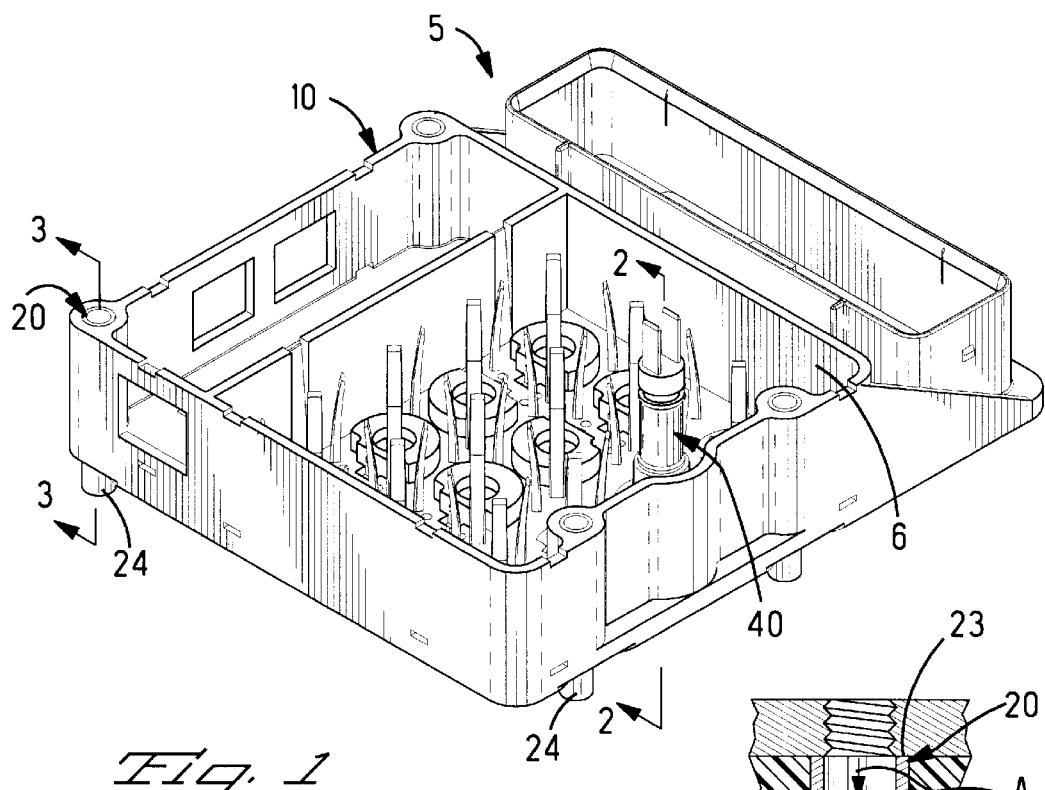
_Fig. 1_
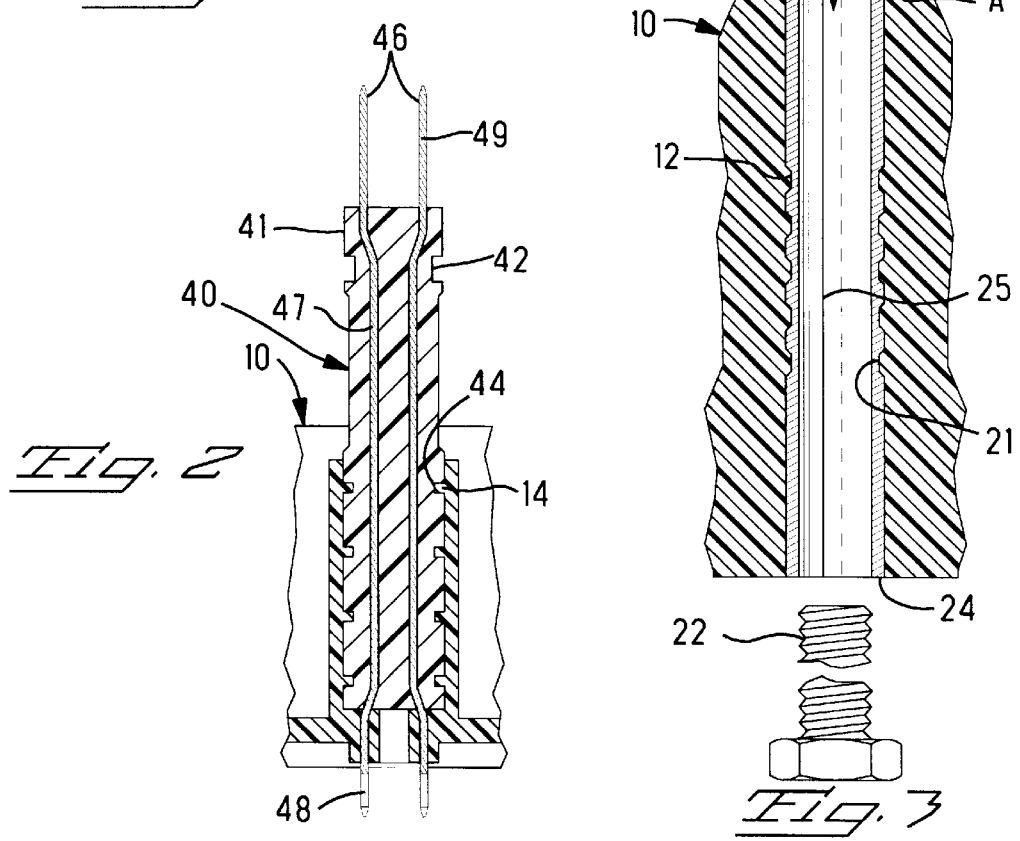
_Fig. 2_
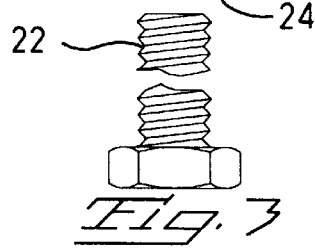
_Fig. 3_

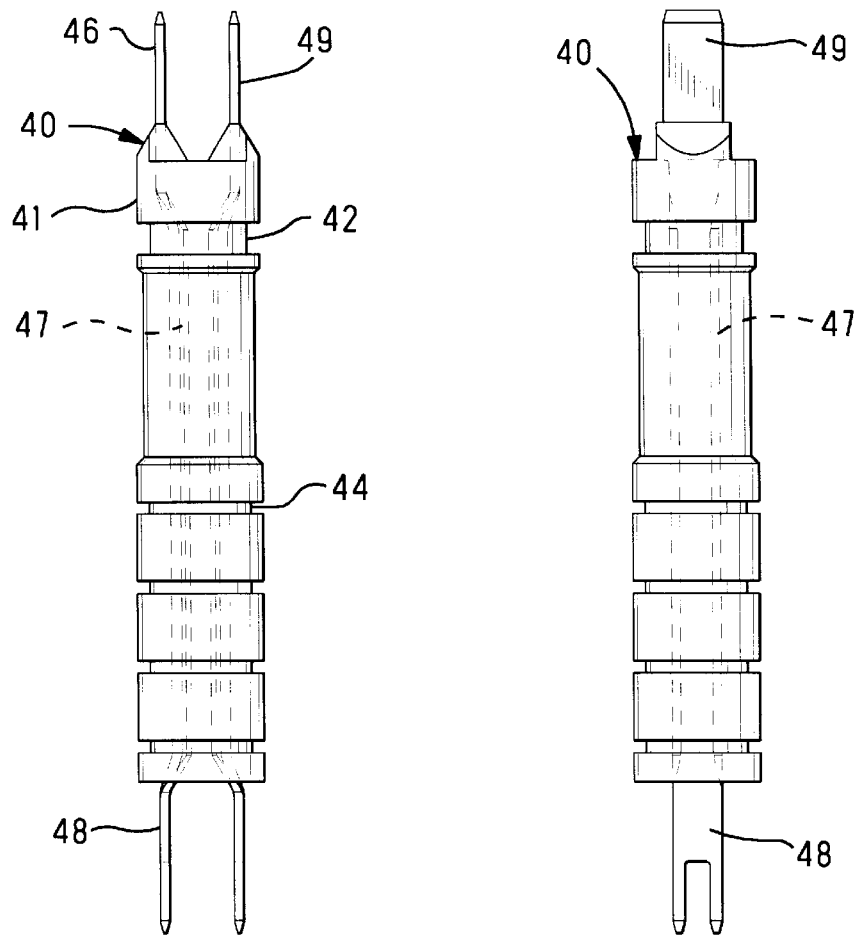
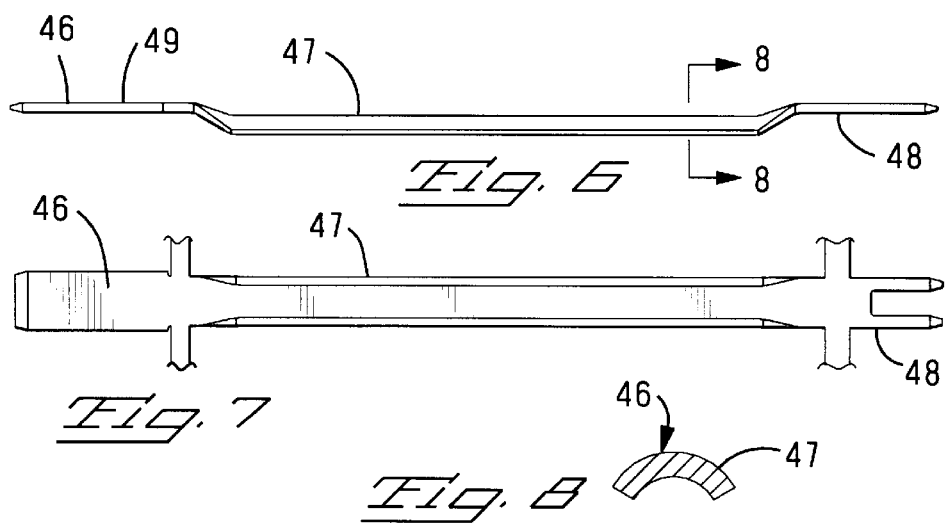

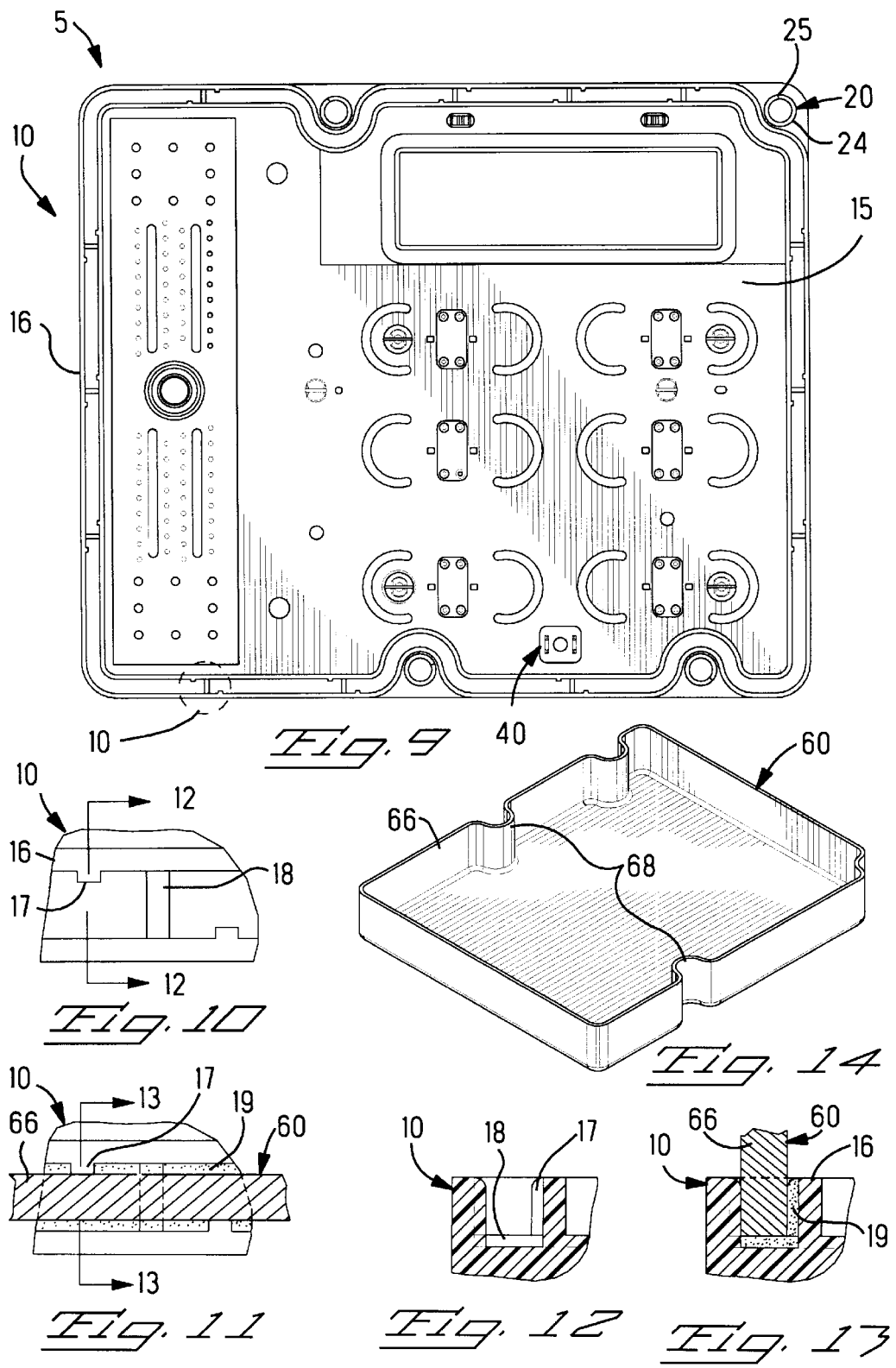

ELECTRICAL COMPONENT AND A HOUSING FOR USE THEREWITH

This application claims the benefit of U.S. Provisional application Ser. No. 60/021,168 filed Jul. 1, 1996.

The present invention relates to an electrical component for transmitting electrical power. More particularly, the present invention relates to an electrical component which comprises an electrical contact molded in a dielectric body, wherein the body is insert-molded in a housing for sealingly fixing the location of the component in the housing.

BACKGROUND OF THE INVENTION

Electrical/electronic component housings manufactured for use in the automotive industry are subjected to particularly harsh conditions including vibration, temperature-cycling, and shock. Electrical/electronic component housings used in such conditions, therefore, must meet rigorous design requirements of the automotive industry, particularly where the housing is designed to protect electrical circuitry for automotive operating equipment. Automotive electrical components which are designed for use with such equipment generally should: comprise a structurally robust and sealed body; be designed to most efficiently perform their electrical function, e.g. by maximization of power transmission to the equipment; and should be manufactured at the lowest achievable cost of production.

Injection-mold technology, which has the advantage of low production costs, is typically used in limited sectors of the electrical connector industry at large to provide an insulating shroud around a respective electrical contact system. However, such conventional molded contact shrouds do not meet the rigorous design requirements of the automotive industry.

A typical molded contact system is disclosed in U.S. Pat. No. 4,274,697, which comprises a plastic plug body with electrical contacts molded therein. The outer surfaces of the plug body are shaped for the basic purpose of gripping of the plug by an operator. Additionally, the geometrical configurations of the electrical contacts, and their locations in the plug, are adapted for use with a conventional plug-and-socket type connection. In sum, the plug body is not particularly structurally robust, and it is not designed to comprise a sealing interface; moreover, the contacts are not designed to maximize power transmission. Thus the plug of the prior art is designed for the less rigorous demands of residential use, rather than for use in the automotive industry where rigorous design requirements are the norm.

SUMMARY OF THE INVENTION

To solve the foregoing problems, the present invention provides a low-cost electrical housing assembly, comprising: a housing, the housing comprises an electrical component receiving section, and an electrical component disposed in the component receiving section, the electrical component comprises an over-molded body comprised of dielectric material molded generally around at least one electrical contact, the body is an integral but discrete part of the housing, and is disposed therein by an insert-molding process so that the material of the component receiving section cooperates with the over-molded body thereby defining a sealing interface therebetween.

More particularly, the over-molded body comprises at least one sealing recess which receives the component receiving section material therein, as the material is in a viscous state during the injection process. As the molded material solidifies, it shrinks, thereby sealingly pressing on the over-molded body.

Additionally, the sealing interfaces mechanically secure the component to the housing and prevent the ingress of harmful contaminants, e.g. moisture, into the housing, thereby protecting the electrical circuitry therein.

Moreover, the electrical contact comprises a generally arcuate cross section for maximizing power transmission across the electrical component. A plurality of the contacts are preferably molded in the over-molded body for maximum power transmission.

BRIEF DESCRIPTION OF THE DRAWINGS

FIG. 1 is an isometric view of the electrical/electronic component housing according to the present invention.

FIG. 2 is a cross sectional view of an electrical component for use with the housing of FIG. 1.

FIG. 3 is a cross sectional view of a seamed spacer sleeve for use with the connector housing of FIG. 2.

FIGS. 4–5 are front and side views of the electrical component of FIG. 2.

FIGS. 6–7 are side and top views of the electrical contact used with the electrical component of FIG. 2.

FIG. 8 is a cross sectional view of the electrical contact of FIG. 6 taken along line 8—8.

FIG. 9 is a bottom view of the housing of FIG. 1 where electrical/electronic interfaces are located.

FIG. 10 is a detail drawing of a peripheral section of the housing of FIG. 9.

FIG. 11 is a top view of the peripheral section of FIG. 10 with a cover wall section inserted and sealed therein.

FIG. 12 is a side view of the detail of FIG. 9 taken along line 12—12.

FIG. 13 is a side view of FIG. 11 taken along line 13—13.

FIG. 14 is an isometric view of a cover which comprises the cover wall of FIG. 11.

DETAILED DESCRIPTION OF THE INVENTION

Figure 15A:
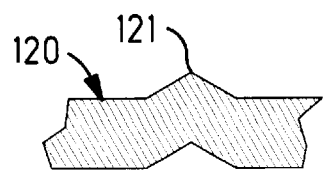
FIGS. 15A, 15B, 16A, 16B, 17A, and 17B are views which depict various configurations of the spacer sleeve of FIG. 3.

Referring to FIGS. 1, 9, and 14 the housing assembly 5 of the present invention will be described. Housing assembly 5 includes: a housing 10 having a cavity 6; spacer sleeves 20 disposed at various positions on the periphery of cavity 6; at least one electrical component 40 located in the cavity 6; and a cover 60 for sealing an electrical interface surface 15 of housing 10 (see FIGS. 9 and 10).

Referring now to FIGS. 2 and 3–7, the electrical component 40 for use with assembly 5 will be described. Electrical component 40 includes a plastic body 41 and electrical contacts 46. Plastic body 41: is formed of a dielectric material which is over-molded around electrical contacts 46; includes an annular recess 42 for receiving a seal therein (not shown); and further includes annular recesses 44 for receiving the material of housing 10 therein. As best shown in FIGS. 5–7, electrical contacts 46, which are substantially identical to each other, each include: a midsection 47; a forked section 48; and a tab or spade section 49.

The large cross sectional area of midsection 47 (see FIG. 8) is advantageously designed to transmit a high quantum of electrical current therethrough for supplying a piece of operating equipment with electrical power. Midsection 47 comprises a generally arcuate shape for maximizing the cross sectional area of the contact 46 and the current carrying capacity of the contact 46. The arcuate shape of midsection 47 complements the arcuate shape of body 41 and thus the midsection will not protrude through the dielectric material of plastic body 41. Plastic body 41 is advantageously over-molded around contacts 46 for electrically isolating the current passing through the contacts whereby body 41 insulates the electrical contacts from each other and other electrical/electronic components within the cavity 6. Moreover, the arcuate cross section strengthens the midsection 47 so that pressures associated with the injection molding process do not bend the contact 46 out of alignment with the mold.

In another advantage of the present invention, recesses 44 will receive plastic material 14 of housing 10 therein (see FIG. 2) as the component 40 is being insert-molded into housing 10. Material 14 will then solidify and shrink slightly, generally along an axial direction of component 40. The shrinking acts to clamp the component 40 axially between recesses 44, thereby making an interlocking structure, so that a hermetic seal is formed between housing 10 and component 40. Additionally, it is contemplated that varying the distance between recesses 44 could enhance the axial compression of component 40.

Figure 15B:
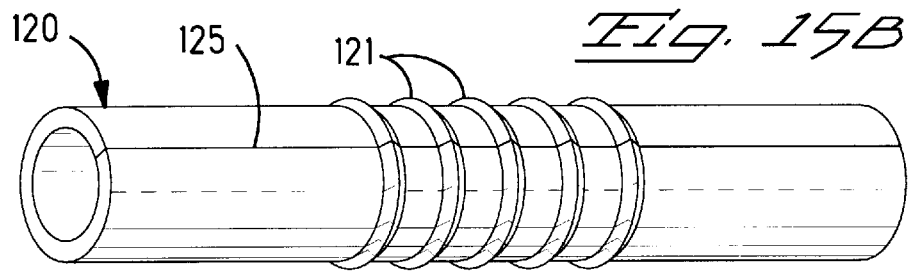
Figure 16A:
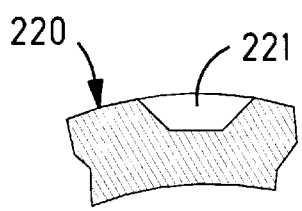
Figure 16B:
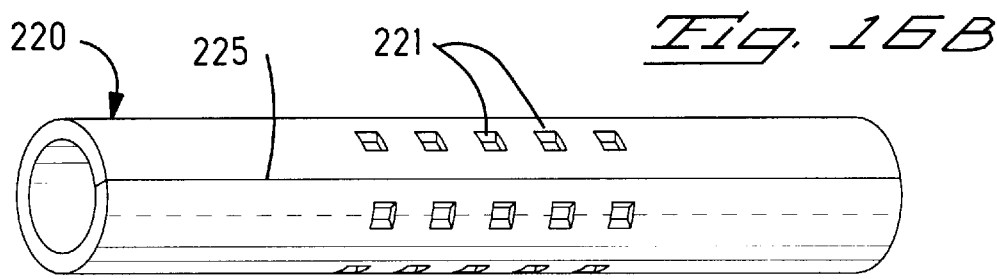
Figure 17A:
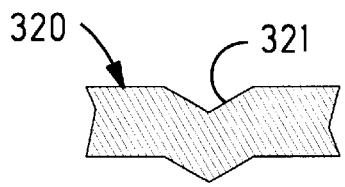
Figure 17B:
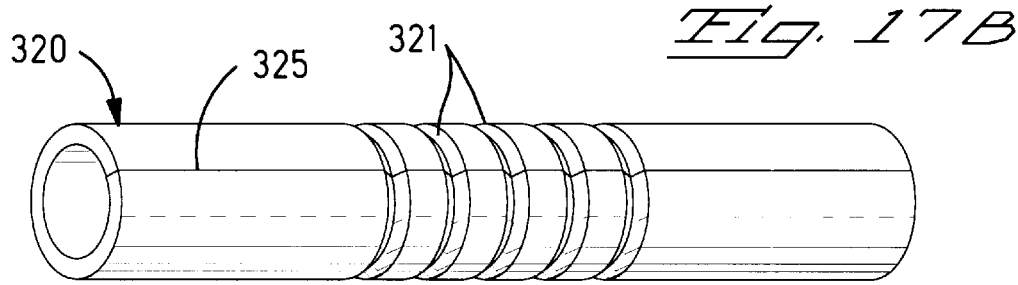

Now referring to FIGS. 1, 3, and 13–15, the spacer sleeve 20 of the present invention will be described. As is best shown in FIG. 3, the spacer sleeve comprises a cylindrical shell having external annular recesses 21. A top edge 23 is generally flush with a top surface of housing 10, and a bottom edge 24 extends below electrical interface area 15 of housing 10. Sleeve 20 comprises an axial seam 25 along its length, which is formed during the stamping and forming process. The sleeves 20 are insert molded into the housing 10, and the material 12 of housing 10 will flow into the annular recesses 21 and solidify, thereby sealingly gripping the spacer sleeve in the housing 10 as the material shrinks.

The spacer sleeve 20 is an inexpensive stamped and formed, generally cylindrical shell member. The main purpose of the seamed spacer sleeve 20 is to receive a fastening member 22 therethrough (see FIG. 3), inserted along the direction of arrow A, whereby the sleeve is subjected to compressive forces generated by the fastening member. In this way, the compressive forces generated by the fastener will not be transmitted to the housing 10, thereby avoiding cracking or fracture of the housing.

For enhanced retention in the housing 10, the seamed spacer sleeve 20 may comprise various outer surfaces for interfacing with the housing material. The spacer sleeve embodiments 120, 220, and 320 of FIGS. 13–15 each include a respective seam 125, 225, 325. Spacer sleeve 120 includes a series of annular rings 121 having an apex section for projecting into the housing material. Spacer sleeve 220 includes dimples 221 for receiving the housing material therein during the insert molding process. Spacer sleeve 320 includes annular recesses 321 for receiving the dielectric material therein during the insert molding process. Each one of the foregoing spacer sleeves will be rigidly mounted to the housing 10 during the insert molding process and will be arranged to withstand compressive forces generated by respective fasteners inserted therethrough, thereby avoiding the transmission of compressive forces to the housing and avoiding cracking and fracturing of the housing material.

Now referring to FIGS. 9–13, the sealing of cover 60 to housing 10 will be described. Referring to FIG. 9, housing 10 includes a double wall section 16 for receiving a wall section 66 of cover 60 therein. The double wall section 16 includes projections 17 and a base section 18 for receiving a sealing wall 66 of cover 60, as shown in FIG. 11. The application of, for example, a silicone based sealant material 19 in double wall section 16, prior to insertion of wall section 66 therein, ensures that the electronics components area 15 on the bottom of housing 10 will be sealed off from contaminants which would otherwise negatively effect performance of the electrical circuitry. Projections 17 advantageously allow the sealant material 19 to flow into the interstices between wall 66 of cover 60 and double wall 16 of housing 10. Moreover, the base sections 18 likewise allow the sealant material 19 to flow into the space below the cover wall 66 thereby providing a sealing interface along the face of the wall 66 (see FIG. 12).

Thus, while a preferred embodiment of the invention has been disclosed, it is to be understood that the invention is not to be strictly limited to such embodiment but may be otherwise variously embodied and practiced within the scope of the appended claims.

Accordingly, what is claimed is:

1. A housing assembly for enclosing electrical components, comprising:

a housing, said housing comprises an electrical component receiving section, and an electrical component disposed in the component receiving section, the electrical component comprises a over-molded body of dielectric material molded generally around at least one electrical contact to form a first sealing interface around the contact between the body and the contact, the body having an axially discontinuous peripheral surface, wherein the housing is over-molded, in the component receiving section, around at least a portion of the over-molded body to define a second sealing interface around the body between the body and the housing, the second sealing interface being at least partially formed along the axially discontinuous peripheral surface of the body, the housing also being over-molded around the contact.

2. The assembly of claim 1, wherein the contact comprises a generally arcuate cross section for maximizing power transmission in the electrical component.

3. The assembly of claim 1 comprising a plurality of recesses on the periphery of the body, each recess having an axial width less than the adjacent separation between adjacent recesses.

4. The assembly of claim 1, wherein the over-molded body comprises at least one sealing recess material forming the over-molded housing entering the at least one sealing recess.

5. The assembly of claim 4, wherein the sealing recess comprises an annular recess in the body.

6. The assembly of claim 4, wherein the body comprises a plurality of sealing recesses.

7. The assembly of claim 1, wherein the sealing interface comprises an interlocking configuration with the component body thereby mechanically securing the component in the housing.

8. The assembly of claim 7, wherein the interlocking configuration is formed by material forming the over-molded housing solidifying and shrinking, generally along an axial direction of said component, the material thereby clamping the component in the housing and forming the interlocking configuration.

* * * * *